US00RE36492E

United States Patent [19]

Shioi et al.

[11] E Patent Number: Re. 36,492

[45] Reissued Date of Patent: Jan. 11, 2000

[54] METHOD FOR PRODUCING CUBIC BORON NITRIDE

[75] Inventors: Kousuke Shioi; Hidefumi Nakano, both of Shiojiri, Japan

[73] Assignee: Showa Denko K.K., Tokyo, Japan

[21] Appl. No.: 08/919,363

[22] Filed: Aug. 28, 1997

Related U.S. Patent Documents

Reissue of:

[64] Patent No.: 5,618,509
Issued: Apr. 8, 1997
Appl. No.: 08/475,604
Filed: Jun. 7, 1995

U.S. Applications:

[63] Continuation-in-part of application No. 08/272,573, Jul. 11, 1994, abandoned.

[30] Foreign Application Priority Data

Jul. 9, 1993 [JP] Japan ..... 5-170537
Feb. 6, 1994 [JP] Japan ..... 6-19508

[51] Int. Cl.[7] ..... C01B 21/064

[52] U.S. Cl. ..... 423/290

[58] Field of Search ..... 423/290

[56] References Cited

U.S. PATENT DOCUMENTS

| | | | |
|---|---|---|---|
| 2,947,617 | 8/1960 | Wentorf, Jr. et al. . | |
| 3,233,988 | 2/1966 | Wentorf, Jr. et al. . | |
| 3,661,521 | 5/1972 | Birle . | |
| 3,772,428 | 11/1973 | De Vries et al. . | |
| 3,918,219 | 11/1975 | Wentorf, Jr. et al. . | |
| 4,148,863 | 4/1979 | Farafontov et al. . | |
| 5,443,603 | 8/1995 | Kirkendall . | |
| 5,443,605 | 8/1995 | Suzuki et al. | 423/290 |

FOREIGN PATENT DOCUMENTS

| | | | |
|---|---|---|---|
| AS1220837 | 7/1966 | Germany . | |
| 89395 | 4/1972 | Germany . | |
| 2829383 | 7/1978 | Germany . | |
| 2829383A1 | 1/1979 | Germany . | |
| 291533 | 7/1991 | Germany | 423/290 |
| 291533A5 | 7/1991 | Germany . | |
| 1220837 | 1/1995 | Germany . | |
| PS89395 | 11/1996 | Germany . | |
| 49-27757 | 7/1974 | Japan . | |
| 49-27758 | 7/1974 | Japan . | |
| 54-145400 | 11/1979 | Japan . | |
| 54145400 | 4/1980 | Japan . | |
| 59-73410 | 4/1984 | Japan . | |

OTHER PUBLICATIONS

L.F. Vereshchagin et al., "Synthesis of Single Crystals of Cubic Boron Nitride in Systems Containing Hydrogen", *Inorg. Mater.* (USA), vol. 15, No. 2 (Feb. 1979), (published Jul., 1979), pp. 201–203. Jul. 1979.

*Primary Examiner*—Wayne Langel
*Attorney, Agent, or Firm*—Sughrue, Mion, Zinn, Macpeak & Sea, PLLC

[57] ABSTRACT hBN is converted to cBN by keeping it under temperature and pressure conditions within the range of stability of cubic boron nitride, in the presence of a mixture of at least two compounds selected from amides and imides of Li, Ca and Mg, or in its copresence with at least one metal selected from elements of Groups Ia, IIa, IIIa, VIa, VIIa, VIII, IIb and IIIb.

20 Claims, 1 Drawing Sheet

METHOD FOR PRODUCING CUBIC BORON NITRIDE

Matter enclosed in heavy brackets [ ] appears in the original patent but forms no part of this reissue specification; matter printed in italics indicates the additions made by reissue.

CROSS REFERENCE TO RELATED APPLICATION

This application is a continuation-in-part application of U.S. Ser. No. 08/272,573 filed on Jul. 11, 1994, abandoned.

BACKGROUND OF THE INVENTION

1. Field of the Invention

The present invention relates to an improved method of synthesizing cubic boron nitride from hexagonal boron nitride.

2. Description of the Related Art

Cubic boron nitride is second only to diamond in hardness but has a greater chemical stability, and therefore it is becoming increasingly more important as a grinding, polishing and cutting material. A variety of methods have been proposed for producing cubic boron nitride, but the most well-known of these, which is widely used industrially, is a method of converting hexagonal boron nitride to cubic boron nitride under the high-temperature, high-pressure conditions of about 5.5 GPa and 1600° C. in the presence of a solvent (catalyst). The well-known solvents (catalysts) for this method have conventionally been nitrides and boronitrides of alkali metals and alkaline earth metals. Of these, lithium-type solvents (catalysts) have been thoroughly studied, and lithium nitride and lithium boronitride are considered to be particularly effective solvents (catalysts) (see, for example, U.S. Pat. No. 3,772,428).

Nevertheless, use of the above mentioned solvents (catalysts) requires high temperature and high pressure to obtain cubic boron nitride in sufficient yields and therefore the above methods are not satisfactory from the industrial point of view. Also, the cubic boron nitrides obtained by use of said solvents (catalysts) have irregular shapes or nearly sphericical shapes, poor in development of euhedral planes.

It is an object of the present invention, in the light of these circumstances, to provide a method of converting hexagonal boron nitride to cubic boron nitride with a high yield, using temperatures and pressures lower than the prior art.

DISCLOSURE OF THE INVENTION

In order to achieve the above mentioned object, the present invention provides, in the first aspect thereof, a method for producing cubic boron nitride which is characterized by keeping hexagonal boron nitride under temperature and pressure conditions within the range of stability of cubic boron nitride, in the presence of a mixture of at least two compounds selected from amides and imides of Li, Ca and Mg, or in the presence both of a mixture of at least two compounds selected from amides and imides of Li, Ca and Mg and of one or more metals selected from elements of Groups Ia, IIa, IIIa, VIa, VIIa, VIII, IIb and IIIb of the Periodic Table, to convert the hexagonal boron nitride to cubic boron nitride.

In the second aspect of the present invention, there is provided a method for producing cubic boron nitride which is characterized by keeping hexagonal boron nitride under temperature and pressure conditions within the range of stability of cubic boron nitride, in the presence of a single compound selected from amides of Ca and Mg and imides of Li, Ca and Mg, or in the presense both of a single compound selected from amides and imides of Li, Ca and Mg and of one or more metals selected from elements of Groups Ia, IIa, IIIa, VIa, VIIa, VIII, IIb and IIIb of the Periodic Table, to convert the hexagonal boron nitride to cubic boron nitride.

The hexagonal boron nitride to be used as the starting material may be commercially available hexagonal boron nitride (hBN) powder. Contaminant oxygen impurities in the form of boron oxide, etc. slow the conversion from hBN to cubic boron nitride (cBN), and thus materials with low oxygen contents are preferred. The granularity thereof is not particularly restricted, but generally 150 mesh or lower is suitable. This is because too great a granularity may result in a lower reactivity with the solvent (catalyst).

It has been discovered that performing the conversion in the presense of a mixture of at least two compounds of the particular amides and imides, or in the presense of said mixture together with at least one metal of the above groups, results in a dramatic improvement in the conversion rate over the method of the prior art.

It has also been found that performing the conversion in the presense of a single compound of the particular amides and imides, or in the presense both of said single compound together with at least one metal of the above group, results in an improvement in the conversion rate over the method of the prior art.

It is generally believed that the hBN reacts with alkali metals, alkaline earth metals or their compounds, functioning as a solvent, or catalyst, to promote the reaction to cBN, and it is likewise believed that the amide or imide compound or its combination with the above metals according to the present invention also functions in the same manner as a solvent or catalyst.

According to the present invention, the Periodic Table is the Long Period type Periodic Table, and the elements in each group are considered to be the following.

Ia: Li, Na, K, Rb, Cs, Fr

IIa: Be, Mg, Ca, Sr, Ba, Ra

IIIa: Sc, Y, lanthanoids (atomic numbers 57–71), actinoids (atomic numbers 89–103)

VIa: Cr, Mo, W

VIIa: Mn, Tc, Re

VIII: Fe, Co, Ni, Ru, Rh, Pd, Os, Ir, Pt

IIb: Zn, Cd, Hg

IIIb: B, Al, Ga, In, Tl

Both the amide or imide of Li, Ca or Mg (hereunder referred to as simply "amide or imide") and the metal selected from group Ia, IIa, IIIa, VIa, VIIa, VIII, IIb and IIb elements preferably contain few oxygen impurities, as in the case of the hBN starting material, and usually powder of 150 mesh or lower, is used.

The amount of the amide and/or imide, or the amide and/or imide and metal(s), to be used is such that the total number of metal atoms making up the additive (the amide and/or imide, or the amide and/or imide and metal(s)) is 2 parts or more, and preferably 5–50 parts, to 100 parts by the number of boron atoms making up the hBN. If the amount of the additive is less than 2 parts, a long time will be required to obtain a sufficient conversion rate. On the other hand, since there is no improvement in the conversion rate even at greater than 50 parts, it is not economical, and therefore neither situation is preferred.

If a mixture of compounds or a single compound selected from amides and imides of Li, Ca and Mg are combined with one or more metals selected from Group Ia, IIa, IIIa, VIa, VIIa, VIII, IIb and IIIb elements, they may be used in any desired proportion, but the atomic ratio of the metal elements is preferably between 95:5 and 5:95. Outside of this range, the effect of the simultaneous addition of the above mentioned compounds and metals will not be sufficiently exhibited, and as a result it will be difficult to achieve a sufficiently high conversion rate.

Furthermore, when amide and/or imide are used in combination with a metal, it is generally possible to obtain cBN at a higher conversion rate than when an amide or imide is used alone, even at a lower temperature and pressure.

As a preferred mode of combining the above mentioned additives with the hexagonal boron nitride, their powders may be mixed together, but layers of the hexagonal boron nitride and the additives may also be arranged for alternate lamination in a reaction container.

Actually, the hBN and the amide and/or imide, or the amide and/or imide and metal(s), are preferably compacted at about 1–2 t/cm$^2$ pressure, either separately or after being filled into the reaction container. This will have an effect of improving the handleability of the crude powders while increasing the productivity by reducing the amount of shrinkage in the reaction container.

The reaction container may be a high-temperature, high-pressure generator capable of maintaining crude powders (hBN and additives) or their compacts, etc. under conditions of temperature and pressure in the range of stability of cBN. This range of stability (temperature and pressure) is reported in P. Bundy, R. H. Wentorf, J. Chem. Phys. 38(5), pp.1144–1149, (1963), and in most cases a minimum temperature and pressure of 1100° C. and 3.8 GPa are effective; however, this will vary depending on the types and combination of the additives (solvent, catalyst), and conversion to cBN is also possible at lower than 1100° C. and 3.8 GPa. The retention time is not particularly limited and should be enough to allow the desired conversion rate to be attained, but in most cases it is from about one second to 6 hours.

The hBN is converted to cBN by being kept in the above mentioned stability range, and if the temperature and pressure conditions are extremely high close to 100% conversion rate may be attained; however, usually a composite lump consisting of a mixture of hBN and cBN is obtained.

The composite lump is crushed to isolate the cBN. The method used for the isolation may be the one described in Japanese Examined Patent Publication (Kokoku) No. 49-27757, wherein, for example, the composite lump is crushed to a size of 5 mm or smaller, preferably 1 mm or smaller, after which sodium hydroxide and a small amount of water are added thereto and heating is effected to about 300° C. to selectively dissolve the hBN, and thus upon cooling, acid cleaning and filtration the cBN is obtained. Also, if there is a residue of a metal used as an additive, it may be removed using hydrochloric acid, nitric acid or the like.

Figure 1:
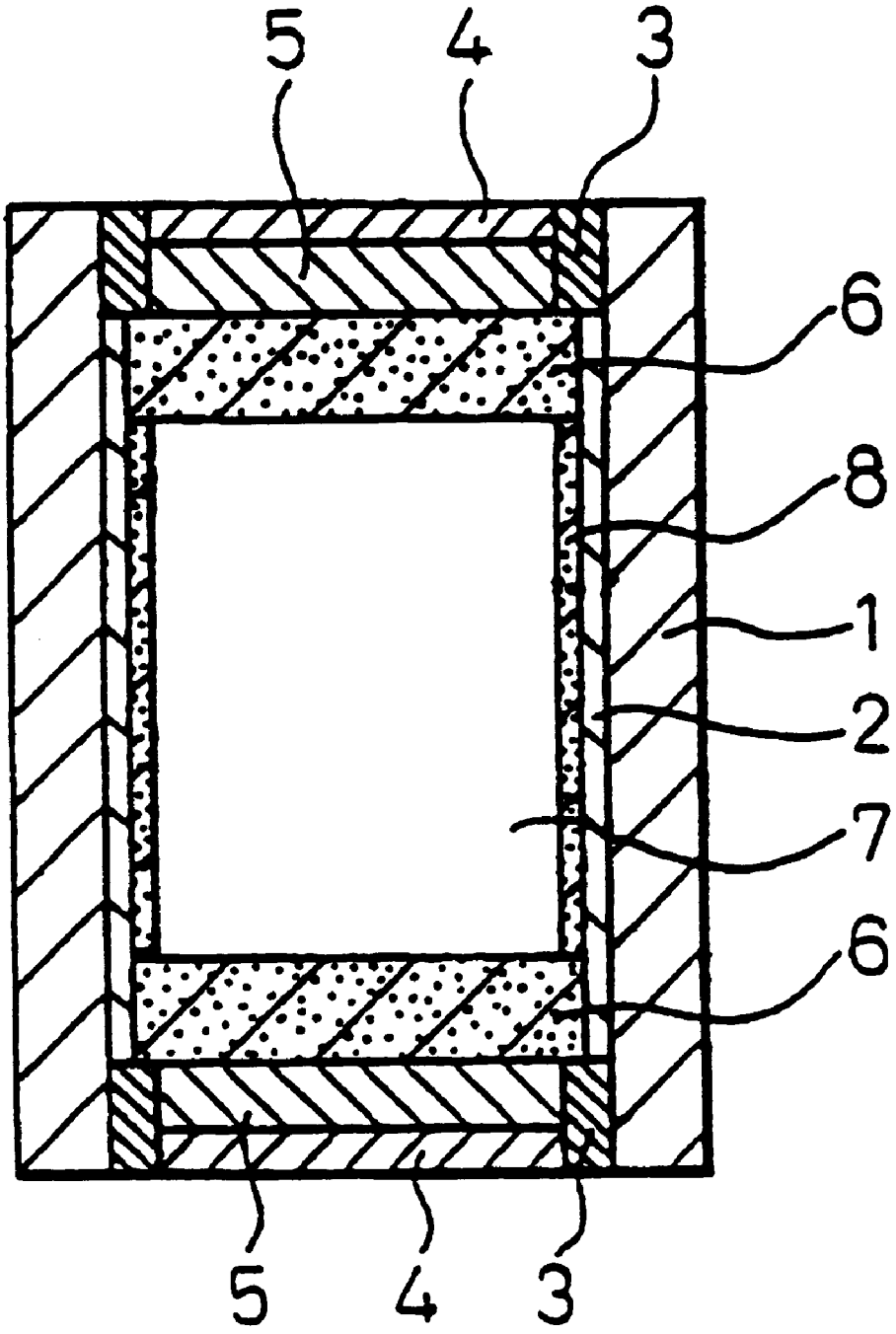
FIG. 1 shows a sectional view of a reaction container used for converting hBN to cBN in the Examples.

EXAMPLES (1) Amide and/or imide system:

Example 1

Lithium amide and magnesium amide were added to hexagonal boron nitride with a granularity of 150 mesh or lower and containing, as impurities, 0.8 wt % of oxygen and 0.2 wt % of a metal impurity other than an alkali metal or alkaline earth metal, at an atomic ratio of 10 parts each of lithium and magnesium to 100 parts of the boron atoms in the compound. This mixture was subjected to 1.5 ton/cm$^2$ pressure to make a 26 mmϕ×32 mmh compact, which was kept in the reaction container shown in FIG. 1.

In the reaction container shown in FIG. 1, the outer wall 1 of the container is made of pyrophyllite as a pressure conveyor, and is a cylindrically shaped, while the inner side thereof is provided with a heater 2 consisting of a graphite cylinder and pyrophyllite 8 as a partitioning material. Also, the top and bottom ends of the container are each provided with a conducting steel ring 3 and a conducting steel plate 4, while the inner sides thereof are provided with a sintered alumina plate 5 and pyrophyllite 6 as a pressure conveyor, and the space surrounded by this pyrophyllite 6 and the pyrophyllite 8 as a partitioning material is used as the holding compartment 7 for holding the raw materials for the reaction.

The above mentioned compact was treated for 10 minutes in this reaction container, under conditions of 4.5 GPa and 1400° C.

The specimen was crushed in a mortar, and an X-ray powder diffraction instrument was used to determine the conversion rate to cubic boron nitride from the intensity ratio of the diffracted rays of the cubic boron nitride (111) and the hexagonal boron nitride (002) using CuK m-rays, and the conversion rate was found to be 93%.

The cubic boron nitride may be isolated (purified) by adding sodium hydroxide and a small amount of water to the specimen prepared by crushing to about 1 mm or less in a mortar or the like, heating it to 300° C., following this with cooling, cleaning with distilled water and hydrochloric acid and filtration, and then drying the filtered residue.

Example 2

Lithium amide and calcium amide were added to hexagonal boron nitride at an atomic ratio of 10 parts lithium and 10 parts calcium to 100 parts of the boron atoms in the compound, to synthesize cubic boron nitride in the same manner as in Example 1, and upon evaluation the conversion rate to cubic boron nitride was found to be 91%.

Example 3

Lithium imide and magnesium imide were added to hexagonal boron nitride at an atomic ratio of 10 parts lithium and 10 parts magnesium to 100 parts of the boron atoms in the compound, to synthesize cubic boron nitride in the same manner as in Example 1, and upon evaluation the conversion rate to cubic boron nitride was found to be 95%.

Example 4

Magnesium amide and calcium amide were added to hexagonal boron nitride at an atomic ratio of 10 parts magnesium and 10 parts calcium to 100 parts of the boron atoms in the compound, to synthesize cubic boron nitride in the same manner as in Example 1, and upon evaluation the conversion rate to cubic boron nitride was found to be 92%.

Example 5

Lithium amide and calcium imide were added to hexagonal boron nitride at an atomic ratio of 10 parts lithium and 10 parts calcium to 100 parts of the boron atoms in the compound, to synthesize cubic boron nitride in the same manner as in Example 1, and upon evaluation the conversion rate to cubic boron nitride was found to be 87%.

Example 6

Lithium imide and calcium imide were added to hexagonal boron nitride at an atomic ratio of 10 parts lithium and 10 parts calcium to 100 parts of the boron atoms in the compound, to synthesize cubic boron nitride in the same manner as in Example 1, and upon evaluation the conversion rate to cubic boron nitride was found to be 88%.

Example 7

Magnesium imide and calcium imide were added to hexagonal boron nitride at an atomic ratio of 10 parts magnesium and 10 parts calcium to 100 parts of the boron atoms in the compound, to synthesize cubic boron nitride in the same manner as in Example 1, and upon evaluation the conversion rate to cubic boron nitride was found to be 86%.

Example 8

Lithium amide, magnesium imide and calcium amide were added to hexagonal boron nitride at an atomic ratio of 10 parts lithium, 10 parts magnesium and 5 parts calcium to 100 parts of the boron atoms in the compound, to synthesize cubic boron nitride in the same manner as in Example 1, and upon evaluation the conversion rate to cubic boron nitride was found to be 93%.

Example 9

Lithium amide, magnesium imide and calcium imide were added to hexagonal boron nitride at an atomic ratio of 10 parts lithium, 10 parts magnesium and 5 parts calcium to 100 parts of the boron atoms in the compound, to synthesize cubic boron nitride in the same manner as in Example 1, and upon evaluation the conversion rate to cubic boron nitride was found to be 90%.

(2) Amide and/or imide and metal system:

Example 10

Hexagonal boron nitride containing, as impurities, 0.8 wt % of oxygen and 0.2 wt % of a metal impurity, was mixed with weighed out portions of lithium amide at an atomic ratio of 10 parts lithium, magnesium amide at an atomic ratio of 10 parts magnesium and magnesium at an atomic ratio of 5 parts, to 100 parts of the boron atoms in the compound. This was subjected to 1.5 ton/cm$^2$ pressure to make a 26 mmϕ×32 mmh compact, which was kept in the reaction container shown in FIG. 1, in the same manner as in Example 1.

The above mentioned compact was treated for 10 minutes in this reaction container, under conditions of 4.0 GPa and 1200° C.

The specimen was crushed in a mortar, and an X-ray powder diffractor was used to determine the conversion rate to cubic boron nitride from the intensity ratio of the diffracted rays of the cubic boron nitride (111) and the hexagonal boron nitride (002) with respect to CuK α-rays, and the conversion rate was found to be 86%.

Example 11

Hexagonal boron nitride was mixed with weighed out portions of lithium amide at an atomic ratio of 10 parts lithium, calcium amide at an atomic ratio of 10 parts calcium, and magnesium at an atomic ratio of 5 parts, to 100 parts of boron atoms in the compound. This was used to synthesize cubic boron nitride in the same manner as in Example 10, and upon evaluation the conversion rate to cubic boron nitride was found to be 91%.

Example 12

Hexagonal boron nitride was mixed with weighed out portions of lithium amide at an atomic ratio of 10 parts lithium, calcium imide at an atomic ratio of 5 parts calcium, and magnesium at an atomic ratio of 10 parts, to 100 parts of boron atoms in the compound. This was used to synthesize cubic boron nitride in the same manner as in Example 10, and upon evaluation the conversion rate to cubic boron nitride was found to be 92%.

Example 13

Hexagonal boron nitride was mixed with weighed out portions of lithium amide at an atomic ratio of 10 parts lithium, magnesium amide at an atomic ratio of 5 parts magnesium, and calcium at an atomic ratio of 10 parts, to 100 parts of boron atoms in the compound. This was used to synthesize cubic boron nitride in the same manner as in Example 10, and upon evaluation the conversion rate to cubic boron nitride was found to be 95%.

Example 14

Hexagonal boron nitride was mixed with weighed out portions of lithium amide at an atomic ratio of 10 parts lithium, magnesium imide at an atomic ratio of 10 parts magnesium, and calcium at an atomic ratio of 5 parts, to 100 parts of boron atoms in the compound. This was used to synthesize cubic boron nitride in the same manner as in Example 10, and upon evaluation the conversion rate to cubic boron nitride was found to be 90%.

Example 15

Hexagonal boron nitride was mixed with weighed out portions of lithium amide at an atomic ratio of 10 parts lithium, calcium imide at an atomic ratio of 5 parts calcium, and magnesium at an atomic ratio of 10 parts, to 100 parts of boron atoms in the compound. This was used to synthesize cubic boron nitride in the same manner as in Example 10, and upon evaluation the conversion rate to cubic boron nitride was found to be 93%.

Example 16

Hexagonal boron nitride was mixed with weighed out portions of lithium imide at an atomic ratio of 10 parts, lithium, magnesium imide at an atomic ratio of 10 parts magnesium, and calcium at an atomic ratio of 5 parts, to 100 parts of boron atoms in the compound. This was used to synthesize cubic boron nitride in the same manner as in Example 10, and upon evaluation the conversion rate to cubic boron nitride was found to be 90%.

(3) Amide or imide and metal system:

Example 17

Hexagonal boron nitride was mixed with weighed out portions of lithium amide at an atomic ratio of 10 parts lithium and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 96%.

(i) Change of added amount:

Reference Example 1

Hexagonal boron nitride was mixed with weighed out portions of lithium amide at an atomic ratio of 0.5 parts lithium and magnesium at an atomic ratio of 0.5 parts, to 100 parts of the boron atoms in the compound. This was used to synthesize cubic boron nitride in the same manner as in Example 10, and upon evaluation the conversion rate to cubic boron nitride was found to be 7%.

Example 18

Hexagonal boron nitride was mixed with weighed out portions of lithium amide at an atomic ratio of 1 part lithium and magnesium at an atomic ratio of 1 part, to 100 parts of the boron atoms in the compound. This was used to synthesize cubic boron nitride in the same manner as in Example 10, and upon evaluation the conversion rate to cubic boron nitride was found to be 74%.

Example 19

Hexagonal boron nitride was mixed with weighed out portions of lithium amide at an atomic ratio of 2.5 parts lithium, and magnesium at an atomic ratio of 2.5 parts, to 100 parts of the boron atoms in the compound. This was used to synthesize cubic boron nitride in the same manner as in Example 10, and upon evaluation the conversion rate to cubic boron nitride was found to be 85%.

Example 20

Hexagonal boron nitride was mixed with weighed out portions of lithium amide at an atomic ratio of 5 parts lithium, and magnesium at an atomic ratio of 5 parts, to 100 parts of the boron atoms in the compound. This was used to synthesize cubic boron nitride in the same manner as in Example 10, and upon evaluation the conversion rate to cubic boron nitride was found to be 90%.

Example 21

Hexagonal boron nitride was mixed with weighed out portions of lithium amide at an atomic ratio of 20 parts lithium, and iron at an atomic ratio of 20 parts, to 100 parts of the boron atoms in the compound. This was used to synthesize cubic boron nitride in the same manner as in Example 10, and upon evaluation the conversion rate to cubic boron nitride was found to be 83%.

Example 22

Hexagonal boron nitride was mixed with weighed out portions of lithium amide at an atomic ratio of 30 parts lithium, and cobalt at an atomic ratio of 30 parts, to 100 parts of the boron atoms in the compound. This was used to synthesize cubic boron nitride in the same manner as in Example 10, and upon evaluation the conversion rate to cubic boron nitride was found to be 8%.

Reference Example 2

Hexagonal boron nitride was mixed with 10 weighed out portions of lithium amide at an atomic ratio of 0.5 parts lithium, and magnesium at an atomic ratio of 9.5 parts, to 100 parts of the boron atoms in the compound. This was used to synthesize cubic boron nitride in the same manner as in Example 10, and upon evaluation the conversion rate to cubic boron nitride was found to be 8%.

Example 23

Hexagonal boron nitride was mixed with weighed out portions of lithium amide at an atomic ratio of 1 parts lithium, and magnesium at an atomic ratio of parts, to 100 parts of the boron atoms in the compound. This was used to synthesize cubic boron nitride in the same manner as in Example 10, and upon evaluation the conversion rate to cubic boron nitride was found to be 75%.

Example 24

Hexagonal boron nitride was mixed with weighed out portions of lithium amide at an atomic ratio of 5 parts lithium, and magnesium at an atomic ratio of parts, to 100 parts of the boron atoms in the compound. This was used to synthesize cubic boron nitride in the same manner as in Example 10, and upon evaluation the conversion rate to cubic boron nitride was found to be 87%.

Example 25

Hexagonal boron nitride was mixed with weighed out portions of lithium amide at an atomic ratio of 15 parts lithium, and magnesium at an atomic ratio of 5 parts, to 100 parts of the boron atoms in the compound. This was used to synthesize cubic boron nitride in the same manner as in Example 10, and upon evaluation the conversion rate to cubic boron nitride was found to be 90%.

Example 26

Hexagonal boron nitride was mixed with weighed out portions of lithium amide at an atomic ratio 10 of 19 parts lithium and magnesium at an atomic ratio of 1 parts, to 100 parts of the boron atoms in the compound. This was used to synthesize cubic boron nitride in the same manner as in Example 10, and upon evaluation the conversion rate to cubic boron nitride was found to be 77%.

Reference Example 3

Hexagonal boron nitride was mixed with weighed out portions of lithium amide at an atomic ratio of 0.5 parts lithium, and magnesium at an atomic ratio of 19.5 parts, to 100 parts of the boron atoms in the compound. This was used to synthesize cubic boron nitride in the same manner as in Example 10, and upon evaluation the conversion rate to cubic boron nitride was found to be 3%.

(ii) Change of combination of amide and metal:

Example 27

Hexagonal boron nitride was mixed with weighed out portions of lithium amide at an atomic ratio of 10 parts lithium and lithium at an atomic ratio of 10 parts, to 100 parts of the boron atoms in the compound. This was used to synthesize cubic boron nitride in the same manner as in Example 10, and upon evaluation the conversion rate to cubic boron nitride was found to be 73%.

Example 28

Hexagonal boron nitride was mixed with weighed out portions of lithium amide at an atomic ratio of 10 parts lithium and chromium at an atomic ratio of 10 parts, to 100 parts of the boron atoms in the compound. This was used to synthesize cubic boron nitride in the same manner as in Example 10, and upon evaluation the conversion rate to cubic boron nitride was found to be 80%.

Example 29

Hexagonal boron nitride was mixed with weighed out portions of lithium amide at an atomic ratio of 10 parts lithium and manganese at an atomic ratio of parts, to 100 parts of the boron atoms in the compound. This was used to synthesize cubic boron nitride in the same manner as in Example 10, and upon evaluation the conversion rate to cubic boron nitride was found to be 81%.

Example 30

Hexagonal boron nitride was mixed with weighed out portions of lithium amide at an atomic ratio of 10 parts lithium and iron at an atomic ratio of 10 parts, to 100 parts of the boron atoms in the compound. This was used to synthesize cubic boron nitride in the same manner as in Example 10, and upon evaluation the conversion rate to cubic boron nitride was found to be 79%.

Example 31

Hexagonal boron nitride was mixed with weighed out portions of lithium amide at an atomic ratio of 10 parts lithium and cobalt at an atomic ratio of 10 parts, to 100 parts of the boron atoms in the compound. This was used to synthesize cubic boron nitride in the same manner as in Example 10, and upon evaluation the conversion rate to cubic boron nitride was found to be 80%.

Example 32

Hexagonal boron nitride was mixed with weighed out portions of magnesium amide at an atomic ratio of 10 parts, magnesium and lithium at an atomic ratio of 10 parts, to 100 parts of the boron atoms in the compound. This was used to synthesize cubic boron nitride in the same manner as in Example 10, and upon evaluation the conversion rate to cubic boron nitride was found to be 89%.

Example 33

Hexagonal boron nitride was mixed with weighed out portions of magnesium amide at an atomic ratio of 10 parts magnesium and calcium at an atomic ratio of 10 parts, to 100 parts of the boron atoms in the compound. This was used to synthesize cubic boron nitride in the same manner as in Example 10, and upon evaluation the conversion rate to cubic boron nitride was found to be 87%.

Example 34

Hexagonal boron nitride was mixed with weighed out portions of magnesium amide at an atomic ratio of 10 parts magnesium, lithium at an atomic ratio of 10 parts, and calcium at an atomic ratio of 5 parts, to 100 parts of the boron atoms in the compound. This was used to synthesize cubic boron nitride in the same manner as in Example 10, and upon evaluation the conversion rate to cubic boron nitride was found to be 86%.

Example 35

Hexagonal boron nitride was mixed with weighed out portions of calcium amide at an atomic ratio of 10 parts calcium and lithium at an atomic ratio of 10 parts, to 100 parts of the boron atoms in the compound. This was used to synthesize cubic boron nitride in the same manner as in Example 10, and upon evaluation the conversion rate to cubic boron nitride was found to be 86%.

Example 36

Hexagonal boron nitride was mixed with weighed out portions of calcium amide at an atomic ratio of 10 parts calcium, and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 92%.

Example 37

Hexagonal boron nitride was mixed with weighed out portions of calcium amide at an atomic ratio of 10 parts calcium, lithium at an atomic ratio of 5 parts, and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 94%.

Example 38

Hexagonal boron nitride was mixed with weighed out portions of lithium amide at an atomic ratio of 10 parts lithium, magnesium at an atomic ratio of 10 parts and calcium at an atomic ratio of 5 parts, to 100 parts of the boron atoms in the compound. This was used to synthesize cubic boron nitride in the same manner as in Example 10, and upon evaluation the conversion rate to cubic boron nitride was found to be 87%.

Example 39

Hexagonal boron nitride was mixed with weighed out portions of lithium amide at an atomic ratio of 10 parts lithium and nickel at an atomic ratio of 10 parts, to 100 parts of the boron atoms in the compound. This was used to synthesize cubic boron nitride in the same manner as in Example 10, and upon evaluation the conversion rate to cubic boron nitride was found to be 88%.

Example 40

Hexagonal boron nitride was mixed with weighed out portions of lithium amide at an atomic ratio of 10 parts lithium and zinc at an atomic ratio of 10 parts, to 100 parts of the boron atoms in the compound. This was used to synthesize cubic boron nitride in the same manner as in Example 10, and upon evaluation the conversion rate to cubic boron nitride was found to be 85%.

Example 41

Hexagonal boron nitride was mixed with weighed out portions of lithium amide at an atomic ratio of 10 parts lithium and aluminum at an atomic ratio of 10 parts, to 100 parts of the boron atoms in the compound. This was used to synthesize cubic boron nitride in the same manner as in Example 10, and upon evaluation the conversion rate to cubic boron nitride was found to be 72%.

Example 42

Hexagonal boron nitride was mixed with weighed out portions of lithium amide at an atomic ratio of 10 parts lithium and lanthanum at an atomic ratio of 10 parts, to 100 parts of the boron atoms in the compound. This was used to synthesize cubic boron nitride in the same manner as in Example 10, and upon evaluation the conversion rate to cubic boron nitride was found to be 76%.

Example 43

Hexagonal boron nitride was mixed with weighed out portions of lithium amide at an atomic ratio of 10 parts lithium and cerium at an atomic ratio of 10 parts, to 100 parts of the boron atoms in the compound. This was used to synthesize cubic boron nitride in the same manner as in Example 10, and upon evaluation the conversion rate to cubic boron nitride was found to be 77%.

Example 44

Hexagonal boron nitride was mixed with weighed out portions of lithium amide at an atomic ratio of 10 parts lithium and praseodymium at an atomic ratio of 10 parts, to 100 parts of the boron atoms in the compound. This was used to synthesize cubic boron nitride in the same manner as in Example 10, and upon evaluation the conversion rate to cubic boron nitride was found to be 78%.

Example 45

Hexagonal boron nitride was mixed with weighed out portions of lithium amide at an atomic ratio of 10 parts lithium and neodymium at an atomic ratio of 10 parts, to 100 parts of the boron atoms in the compound. This was used to synthesize cubic boron nitride in the same manner as in Example 10, and upon evaluation the conversion rate to cubic boron nitride was found to be 77%.

Example 46

Hexagonal boron nitride was mixed with weighed out portions of lithium amide at an atomic ratio of 10 parts lithium and samarium at an atomic ratio of 10 parts, to 100 parts of the boron atoms in the compound. This was used to synthesize cubic boron nitride in the same manner as in Example 10, and upon evaluation the conversion rate to cubic boron nitride was found to be 76%.

Example 47

Hexagonal boron nitride was mixed with weighed out portions of lithium amide at an atomic ratio of 10 parts lithium and gadolinium at an atomic ratio of 10 parts, to 100 parts of the boron atoms in the compound. This was used to synthesize cubic boron nitride in the same manner as in Example 10, and upon evaluation the conversion rate to cubic boron nitride was found to be 76%.

Example 48

Hexagonal boron nitride was mixed with weighed out portions of lithium amide at an atomic ratio of 10 parts lithium, magnesium at an atomic ratio of 10 parts and nickel at an atomic ratio of 5 parts, to 100 parts of the boron atoms in the compound. This was used to synthesize cubic boron nitride in the same manner as in Example 10, and upon evaluation the conversion rate to cubic boron nitride was found to be 95%.

(iii) Change of combination of imide and metal:

Example 49

Hexagonal boron nitride was mixed with weighed out portions of lithium imide at an atomic ratio of 10 parts lithium and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 74%.

Example 50

Hexagonal boron nitride was mixed with weighed out portions of lithium imide at an atomic ratio of 10 parts lithium and calcium at an atomic ratio of 10 parts, to 100 parts of the boron atoms in the compound. This was used to synthesize cubic boron nitride in the same manner as in Example 10, and upon evaluation the conversion rate to cubic boron nitride was found to be 85%.

Example 51

Hexagonal boron nitride was mixed with weighed out portions of lithium imide at an atomic ratio of 10 parts lithium, magnesium at an atomic ratio of 10 parts and calcium at an atomic ratio of 5 parts, to 100 parts of the boron atoms in the compound. This was used to synthesize cubic boron nitride in the same manner as in Example 10, and upon evaluation the conversion rate to cubic boron nitride was found to be 83%.

Example 52

Hexagonal boron nitride was mixed with weighed out portions of magnesium imide at an atomic ratio of 10 parts magnesium, and lithium at an atomic ratio of 10 parts, to 100 parts of the boron atoms in the compound. This was used to synthesize cubic boron nitride in the same manner as in Example 10, and upon evaluation the conversion rate to cubic boron nitride was found to be 91%.

Example 53

Hexagonal boron nitride was mixed with weighed out portions of magnesium imide at an atomic ratio of 10 parts magnesium and calcium at an atomic ratio of 10 parts, to 100 parts of the boron atoms in the compound. This was used to synthesize cubic boron nitride in the same manner as in Example 10, and upon evaluation the conversion rate to cubic boron nitride was found to be 86%.

Example 54

Hexagonal boron nitride was mixed with weighed out portions of magnesium imide at an atomic ratio of 10 parts magnesium, lithium at an atomic ratio of 10 parts and calcium at an atomic ratio of 5 parts, to 100 parts of the boron atoms in the compound. This was used to synthesize cubic boron nitride in the same manner as in Example 10, and upon evaluation the conversion rate to cubic boron nitride was found to be 83%.

Example 55

Hexagonal boron nitride was mixed with weighed out portions of calcium imide at an atomic ratio of 10 parts calcium, and lithium at an atomic ratio of 10 parts, to 100 parts of the boron atoms in the compound. This was used to synthesize cubic boron nitride in the same manner as in Example 10, and upon evaluation the conversion rate to cubic boron nitride was found to be 85%.

Example 56

Hexagonal boron nitride was mixed with weighed out portions of calcium imide at an atomic ratio of 10 parts calcium, and magnesium at an atomic ratio of 10 parts to 100 parts of the boron atoms in the compound. This was used to synthesize cubic boron nitride in the same manner as in Example 10, and upon evaluation the conversion rate to cubic boron nitride was found to be 87%.

Example 57

Hexagonal boron nitride was mixed with weighed out portions of calcium imide at an atomic ratio of 10 parts calcium, lithium at an atomic ratio of 5 parts and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 85%.

Example 58

Magnesium amide was added to hexagonal boron nitride at an atomic ratio of 20 parts magnesium to 100 parts of the boron atoms in the compound, to synthesize cubic boron nitride in the same manner as in Example 1, and upon evaluation the conversion rate to cubic boron nitride was found to be 88%.

Example 59

Calcium amide was added to hexagonal boron nitride at an atomic ratio of 20 parts calcium to 100 parts of the boron atoms in the compound, to synthesize cubic 4boron nitride in the same manner as in Example 1, and upon evaluation the conversion rate to cubic boron nitride was found to be 82%.

Example 60

Lithium imide was added to hexagonal boron nitride at an atomic ratio of 20 parts lithium to 100 parts of the boron atoms in the compound, to synthesize cubic boron nitride in the same manner as in Example 1, and upon evaluation the conversion rate to cubic boron nitride was found to be 83%.

Example 61

Magnesium imide was added to hexagonal boron nitride at an atomic ratio of 20 parts magnesium to 100 parts of the boron atoms in the compound, to synthesize cubic boron nitride in the same manner as in Example 1, and upon evaluation the conversion rate to cubic boron nitride was found to be 85%.

Example 62

Calcium imide was added to hexagonal boron nitride at an atomic ratio of 20 parts calcium to 100 parts of the boron atoms in the compound, to synthesize cubic boron nitride in the same manner as in Example 1, and upon evaluation the conversion rate to cubic boron nitride was found to be 85%.

Example 63

Lithium imide and magnesium amide were added to hexagonal boron nitride at an atomic ratio of 10 parts each of lithium and magnesium to 100 parts of the boron atoms in the compound, to synthesize cubic boron nitride in the same manner as in Example 1, and upon evaluation the conversion rate to cubic boron nitride was found to be 93%.

Comparative Example 1

Lithium nitride was added to hexagonal boron nitride at an atomic ratio of 20 parts lithium to 100 parts of the boron atoms in the compound, to synthesize cubic boron nitride in the same manner as in Example 1, and upon evaluation the conversion rate to cubic boron nitride was found to be 7%.

Comparative Example 2

Lithium boronitride $LiBN_2$ was added to hexagonal boron nitride at an atomic ratio of 20 parts lithium to 100 parts of the boron atoms in the compound, to synthesize cubic boron nitride in the same manner as in Example 1, and upon evaluation the conversion rate to cubic boron nitride was found to be 14%.

Comparative Example 3

Magnesium was added to hexagonal boron nitride at an atomic ratio of 20 parts to 100 parts of the boron atoms in the compound, to synthesize cubic boron nitride in the same manner as in Example 1, and upon evaluation the conversion rate to cubic boron nitride was found to be 54%.

Comparative Example 4

Hexagonal boron nitride was mixed with a weighed out portion of lithium nitride at an atomic ratio of 10 parts lithium to 100 parts of the boron atoms in the compound. This was used to synthesize cubic boron nitride in the same manner as in Example 5, and upon evaluation the conversion rate to cubic boron nitride was found to be 0%.

Comparative Example 5

Hexagonal boron nitride was mixed with a weighed out portion of lithium boronitride $Li_3BN_2$ at an atomic ratio of 10 parts lithium to 100 parts of the boron atoms in the compound. This was used to synthesize cubic boron nitride in the same manner as in Example 5, and upon evaluation the conversion rate to cubic boron nitride was found to be 0%.

Comparative Example 6

Hexagonal boron nitride was mixed with a weighed out portion of magnesium at an atomic ratio of 10 parts to 100 parts of the boron atoms in the compound. This was used to synthesize cubic boron nitride in the same manner as in Example 5, and upon evaluation the conversion rate to cubic boron nitride was found to be 0%.

Comparative Example 7

Hexagonal boron nitride was mixed with weighed out portions of lithium nitride at an atomic ratio of 10 parts lithium and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 0%.

Comparative Example 8

Hexagonal boron nitride was mixed with weighed out portions of lithium boronitride $Li_3BN_2$ at an atomic ratio of 10 parts lithium, and magnesium at an atomic ratio of 10 parts, to 100 parts of the boron atoms in the compound. This was used to synthesize cubic boron nitride in the same manner as in Example 10, and upon evaluation the conversion rate to cubic boron nitride was found to be 0%.

According to the present invention, it is possible to considerably improve the conversion rate of methods of synthesizing cubic boron nitride using hexagonal boron nitride as the starting material.

Reference Example 4

Lithium amide was added to hexagonal boron nitride at an atomic ratio of 20 parts lithium to 100 parts of the boron atoms in the compound, to synthesize cubic boron nitride in the same manner as in Example 1, and upon evaluation the conversion rate to cubic boron nitride was found to be 84%.

Reference Example 5

The procedures of Reference Example 1 were repeated to synthesize cubic boron nitride from hexagonal boron nitride except that the compact of hexagonal boron nitride with lithium amide was treated for 10 minutes under condition of 4.0 Pa and 1200° C. Upon evaluation the conversion rate to cubic boron nitride was found to be 22%.

Reference Example 6

Hexagonal boron nitride was mixed with weighed out portions of lithium amide at an atomic ratio of 10 parts lithium and lithium boronitride $Li_3BN_2$ at an atomic ratio of 10 parts lithium, to 100 parts of the boron atoms in the compound. This was used to synthesize cubic boron nitride in the same manner as in Example 10, and upon evaluation the conversion rate to cubic boron nitride was found to be 24%.

Reference Example 7

Hexagonal boron nitride was mixed with weighed out portions of lithium amide at an atomic ratio of 10 parts lithium, and magnesium bronitride $Mg_3BN_3$ at an atomic ratio of 10 parts magnesium, to 100 parts of the boron atoms in the compound. This was used to synthesize cubic boron nitride in the same manner as in Example 10, and upon evaluation the conversion rate to cubic boron nitride was found to be 21%.

Reference Example 8

Hexagonal boron nitride was mixed with weighed out portions of lithium amide at an atomic ratio of 10 parts lithium and magnesium boronitride $Mg_3B_2N_4$ at an atomic ratio of 10 parts magnesium, to 100 parts of the boron atoms in the compound. This was used to synthesize cubic boron nitride in the same manner as in Example 10, and upon evaluation the conversion rate to cubic boron nitride was found to be 20%.

Reference Example 9

Hexagonal boron nitride was mixed with weighed out portions of lithium amide at an atomic ratio of 10 parts lithium and calcium boronitride $Ca_3B_2N_4$ at an atomic ratio of 10 parts calcium, to 100 parts of the boron atoms in the compound. This was used to synthesize cubic boron nitride in the same manner as in Example 10, and upon evaluation the conversion rate to cubic boron nitride was found to be 16%.

The results of Example 1 to 63, Comparative Examples 1 to 8, and Reference Example 1 to 9 are summarized in the following tables.

TABLE 1

| Example No. | Solvent (Catalyst) | Added amount | Reaction condition | Conversion rate |
|---|---|---|---|---|
| 1 | $LiNH_2$—$Mg(NH_2)_2$ | 10-10 | 4.5 GPa-1400° C. | 93% |
| 2 | $LiNH_2$—$Ca(NH_2)_2$ | 10-10 | 4.5 GPa-1400° C. | 91% |
| 3 | $Li_2NH$—MgNH | 10-10 | 4.5 GPa-1400° C. | 95% |
| 4 | $Mg(NH2)_2$—$Ca(NH_2)_2$ | 10-10 | 4.5 GPa-1400° C. | 92% |
| 5 | $LiNH_2$—CaNH | 10-10 | 4.5 GPa-1400° C. | 87% |
| 6 | $Li_2NH$—CaNH | 10-10 | 4.5 GPa-1400° C. | 88% |
| 7 | MgNH—CaNH | 10-10 | 4.5 GPa-1400° C. | 86% |
| 8 | $LiNH_2$—MgNH—$Ca(NH_2)_2$ | 10-10-5 | 4.5 GPa-1400° C. | 93% |
| 9 | $LiNH_2$—MgNH—CaNH | 10-10-5 | 4.5 GPa-1400° C. | 90% |

TABLE 2

| Example No. | Solvent (Catalyst) | Added amount | Reaction condition | Conversion rate |
|---|---|---|---|---|
| 10 | $LiNH_2$—Mg—$Mg(NH_2)_2$ | 10-5-10 | 4.0 GPa-1200° C. | 86% |
| 11 | $LiNH_2$—Mg—$Ca(NH_2)_2$ | 10-10-5 | 4.0 GPa-1200° C. | 91% |
| 12 | $LiNH_2$—Mg—CaNH | 10-10-5 | 4.0 GPa-1200° C. | 92% |
| 13 | $LiNH_2$—Ca—$Mg(NH_2)_2$ | 10-10-5 | 4.0 GPa-1200° C. | 95% |

TABLE 2-continued

| Example No. | Solvent (Catalyst) | Added amount | Reaction condition | Conversion rate |
|---|---|---|---|---|
| 14 | $LiNH_2$—Ca—MgNH | 10-5-10 | 4.0 GPa-1200° C. | 90% |
| 15 | $Li_2NH$—Mg—CaNH | 10-10-5 | 4.0 GPa-1200° C. | 93% |
| 16 | $Li_2NH$—Ca—MgNH | 10-5-10 | 4.0 GPa-1200° C. | 90% |

TABLE 3

| Example No. | Solvent (Catalyst) | Added amount | Reaction condition | Conversion rate |
|---|---|---|---|---|
| *Ref. Ex. 1 | $LiNH_2$—Mg | 0.5-0.5 | 4.0 GPa-1200° C. | 7% |
| 18 | $LiNH_2$—Mg | 1-1 | 4.0 GPa-1200° C. | 74% |
| 19 | $LiNH_2$—Mg | 2.5-2.5 | 4.0 GPa-1200° C. | 85% |
| 20 | $LiNH_2$—Mg | 5-5 | 4.0 GPa-1200° C. | 90% |
| 17 | $LiNH_2$—Mg | 10-10 | 4.0 GPa-1200° C. | 96% |
| 21 | $LiNH_2$—Mg | 20-20 | 4.0 GPa-1200° C. | 83% |
| 22 | $LiNH_2$—Mg | 30-30 | 4.0 GPa-1200° C. | 88% |

*Ref. Ex. 1 is Reference Example 1.

TABLE 4

| Example No. | Solvent (Catalyst) | Added amount | Reaction condition | Conversion rate |
|---|---|---|---|---|
| *Ref. Ex. 2 | $LiNH_2$—Mg | 0.5-19.5 | 4.0 GPa-1200° C. | 8% |
| 23 | $LiNH_2$—Mg | 1-19 | 4.0 GPa-1200° C. | 75% |
| 24 | $LiNH_2$—Mg | 5-15 | 4.0 GPa-1200° C. | 87% |
| 17 | $LiNH_2$—Mg | 10-10 | 4.0 GPa-1200° C. | 96% |
| 25 | $LiNH_2$—Mg | 15-5 | 4.0 GPa-1200° C. | 90% |
| 26 | $LiNH_2$—Mg | 19-1 | 4.0 GPa-1200° C. | 77% |
| *Ref. Ex. 3 | $LiNH_2$—Mg | 0.5-14 | 4.0 GPa-1200° C. | 3% |

*Ref. Ex. is Reference Example.

TABLE 5

| Example No. | Solvent (Catalyst) | Added amount | Reaction condition | Conversion rate |
|---|---|---|---|---|
| 17 | $LiNH_2$—Mg | 10-10 | 4.0 GPa-1200° C. | 96% |
| 27 | $LiNH_2$—Li | 10-10 | 4.0 GPa-1200° C. | 73% |
| 28 | $LiNH_2$—Cr | 10-10 | 4.0 GPa-1200° C. | 80% |
| 29 | $LiNH_2$—Mn | 10-10 | 4.0 GPa-1200° C. | 81% |
| 30 | $LiNH_2$—Fe | 10-10 | 4.0 GPa-1200° C. | 79% |
| 31 | $LiNH_2$—Co | 10-10 | 4.0 GPa-1200° C. | 80% |
| 32 | $Mg(NH_2)_2$—Li | 10-10 | 4.0 GPa-1200° C. | 89% |
| 33 | $Mg(NH_2)_2$—Ca | 10-10 | 4.0 GPa-1200° C. | 87% |
| 34 | $Mg(NH_2)_2$—Li—Ca | 10-10-5 | 4.0 GPa-1200° C. | 86% |
| 35 | $Ca(NH_2)_2$—Li | 10-10 | 4.0 GPa-1200° C. | 86% |
| 36 | $Ca(NH_2)_2$—Mg | 10-10 | 4.0 GPa-1200° C. | 92% |
| 37 | $Ca(NH_2)_2$—Li—Mg | 10-5-10 | 4.0 GPa-1200° C. | 94% |
| 38 | $LiNH_2$—Mg—Ca | 10-10-5 | 4.0 GPa-1200° C. | 87% |
| 39 | $LiNH_2$—Ni | 10-10 | 4.0 GPa-1200° C. | 88% |
| 40 | $LiNH_2$—Zn | 10-10 | 4.0 GPa-1200° C. | 85% |
| 41 | $LiNH_2$—Al | 10-10 | 4.0 GPa-1200° C. | 72% |
| 42 | $LiNH_2$—La | 10-10 | 4.0 GPa-1200° C. | 76% |
| 43 | $LiNH_2$—Ce | 10-10 | 4.0 GPa-1200° C. | 77% |
| 44 | $LiNH_2$—Pr | 10-10 | 4.0 GPa-1200° C. | 78% |
| 45 | $LiNH_2$—Nd | 10-10 | 4.0 GPa-1200° C. | 77% |
| 46 | $LiNH_2$—Sm | 10-10 | 4.0 GPa-1200° C. | 76% |
| 47 | $LiNH_2$—Gd | 10-10 | 4.0 GPa-1200° C. | 76% |
| 48 | $LiNH_2$—Mg-Ni | 10-10-5 | 4.0 GPa-1200° C. | 95% |

TABLE 6

| Example No. | Solvent (Catalyst) | Added amount | Reaction Condition | Conversion rate |
|---|---|---|---|---|
| 49 | $Li_2NH$—Mg | 10-10 | 4.0 GPa-1200° C. | 74% |
| 50 | $Li_2NH$—Ca | 10-10 | 4.0 GPa-1200° C. | 85% |
| 51 | $Li_2NH$—Mg—Ca | 10-10-5 | 4.0 GPa-1200° C. | 83% |
| 52 | MgNH—Li | 10-10 | 4.0 GPa-1200° C. | 91% |
| 53 | MgNH—Ca | 10-10 | 4.0 GPa-1200° C. | 86% |
| 54 | MgNH—Li—Ca | 10-10-5 | 4.0 GPa-1200° C. | 83% |
| 55 | CaNH—Li | 10-10 | 4.0 GPa-1200° C. | 85% |
| 56 | CaNH—Mg | 10-10 | 4.0 GPa-1200° C. | 87% |
| 57 | CaNH—Li—Mg | 10-5-10 | 4.0 GPa-1200° C. | 85% |

TABLE 6

| Example No. | Solvent (Catalyst) | Added amount | Reaction Condition | Conversion rate |
|---|---|---|---|---|
| 58 | $Mg(NH_2)_2$ | 20 | 4.5 GPa-1400° C. | 88% |
| 59 | $Ca(NH_2)_2$ | 20 | 4.5 GPa-1400° C. | 82% |
| 60 | $Li_2NH$ | 20 | 4.5 GPa-1400° C. | 83% |
| 61 | MgNH | 20 | 4.5 GPa-1400° C. | 85% |
| 62 | CaNH | 20 | 4.5 GPa-1400° C. | 85% |
| 63 | $Li_2NH$—$Mg(NH_2)_2$ | 10-10 | 4.5 GPa-1400° C. | 93% |

TABLE 7

| Comparative Example No. | Solvent (Catalyst) | Added Amount | Reaction condition | Conversion state |
|---|---|---|---|---|
| 1 | $Li_3N$ | 20 | 4.5 GPa-1400° C. | 7% |
| 2 | $Li_3BN_2$ | 20 | 4.5 GPa-1400° C. | 14% |
| 3 | Mg | 20 | 4.5 GPa-1400° C. | 54% |
| 4 | $Li_3N$ | 10 | 4.0 GPa-1200° C. | 0% |
| 5 | $Li_3BN_2$ | 10 | 4.0 GPa-1200° C. | 0% |
| 6 | Mg | 10 | 4.0 GPa-1200° C. | 0% |
| 7 | $Li_3N$—Mg | 10-10 | 4.0 GPa-1200° C. | 0% |
| 8 | $Li_3BN_2$—Mg | 10-10 | 4.0 GPa-1200° C. | 0% |

TABLE 8

| Reference Example No. | Solvent (Catalyst) | Added amount | Reaction condition | Conversion rate |
|---|---|---|---|---|
| 4 | $LiNH_2$ | 20 | 4.5 GPa-1400° C. | 84% |
| 5 | $LiNH_2$ | 20 | 4.0 GPa-1200° C. | 22% |
| 6 | $LiNH_2$—$Li_3BN_2$ | 10-10 | 4.0 GPa-1200° C. | 24% |
| 7 | $LiNH_2$—$Mg_3BN_3$ | 10-10 | 4.0 GPa-1200° C. | 21% |
| 8 | $LiNH_2$—$Mg_3B_2N_2$ | 10-10 | 4.0 GPa-1200° C. | 20% |
| 9 | $LiNH_2$—$Ca_3B_2N_4$ | 10-10 | 4.0 GPa-1200° C. | 16% |

We claim:

1. A method for producing cubic boron nitride, comprising keeping hexagonal boron nitride under temperature and pressure conditions within the range of stability of cubic boron nitride in the presence of a mixture of at least two compounds selected from the group consisting of amides and imides of Li, Ca and Mg, to convert said hexagonal boron nitride to cubic boron nitride.

2. A method according to claim 1, wherein said at least two amides and imides [are] compounds *are* used such that the total number of metal atoms making up the compounds is 2 parts or more to 100 parts of the number of boron making up the hexagonal boron nitride.

3. A method according to claim 2, wherein said at least two amides and imides compounds are used such that the total number of the metal atoms making up the compounds is 5 to 50 parts to 100 parts of the number of boron atoms making up the hexagonal boron nitride.

4. A method according to claim 1, wherein said region of stability of cubic boron nitride is selected to have a temperature of 1100° C. or higher and a pressure of 3.8 GPa or higher.

5. A method according to claim 1, wherein *a conversion rate is less than 100%, so that a composite lump comprising a mixture of hexagonal boron nitride and cubic boron nitride is formed, and* the method *further* includes crushing the [converted cubic boron nitride] *composite lump*, then adding sodium hydroxide and water thereto and heating to selectively dissolve the hexagonal boron nitride, and then cooling, acid cleaning and filtering, so as to isolate the cubic boron nitride.

6. A method for producing cubic boron nitride, comprising keeping hexagonal boron nitride under temperature and pressure conditions within the range of stability of cubic boron nitride in the presence both of a mixture of at least two compounds selected from the group consisting of amides and imides of Li, Ca and Mg and of one or more metals selected from the group consisting of elements of Groups Ia, IIa, IIIa, VIa, VIIa, VIII, IIb and IIIb of the Periodic Table, to convert said hexagonal boron nitride to cubic boron nitride.

7. A method according to claim 6, wherein said at least two of amides and imides compounds of Li, Ca and Mg and said one or more metals from Groups Ia, IIa, IIIa, VIa, VIIa, VIII, IIb and IIIb are used such that the total number of the metal atoms making up the compounds and the latter metals is 2 parts or more to 100 parts of the number of boron making up the hexagonal boron nitride.

8. A method according to claim 7, wherein said at least two amides and imides compounds of Li, Ca and Mg and said one or more metals from Groups Ia, IIa, IIIa, VIa, VIIa, VIII, IIb and IIIb are used such that the total number of the metal atoms making up the compounds and the latter metals is 5 to 50 parts or more to 100 parts of the number of boron making up the hexagonal boron nitride.

9. A method according to claim 6, wherein said region of stability of cubic boron nitride is selected to have a temperature of 1100° C. or higher and a pressure of 3.8 GPa or higher.

10. A method according to claim 6, wherein *a conversion rate is less than 100%, so that a composite lump comprising a mixture of hexagonal boron nitride and cubic boron nitride is formed, and* the method *further* includes crushing the [converted cubic boron nitride] *composite lump*, and then adding sodium hydroxide and water thereto and heating to selectively dissolve the hexagonal boron nitride, and then cooling, acid cleaning and filtering, so as to isolate the cubic boron nitride.

11. A method for producing cubic boron nitride, comprising keeping hexagonal boron nitride under temperature and pressure conditions within the range of stability of cubic boron nitride in the presence of a single compound selected from the group consisting of amides of Ca and Mg and imides of Li, Ca and Mg, to convert said hexagonal boron nitride to cubic boron nitride.

12. A method according to claim 11, wherein said single amide or imide compound is used such that the total number of metal atoms making up the compound is 2 parts or more to 100 parts of the number of boron making up the hexagonal boron nitride.

13. A method according to claim 12, wherein said single amide or imide compound is used such that the total number of the metal atoms making up the compound is 5 to 50 parts to 100 parts of the number of boron atoms making up the hexagonal boron nitride.

14. A method according to claim 11, wherein said region of stability of cubic boron nitride is selected to have a temperature of 1100° C. or higher and a pressure of 3.8 GPa or higher.

15. A method according to claim 11, wherein *a conversion rate is less than 100%, so that a composite lump comprising a mixture of hexagonal boron nitride and cubic boron nitride is formed, and* the method *further* includes crushing the [converted cubic boron nitride] *composite lump* and then adding sodium hydroxide and water thereto and heating to selectively dissolve the hexagonal boron nitride, and then cooling, acid cleaning and filtering, so as to isolate the cubic boron nitride.

16. A method for producing cubic boron nitride, comprising keeping hexagonal boron nitride under temperature and pressure conditions within the range of stability of cubic boron nitride in the presence both of a single compound selected from the group consisting of amides and imides of Li, Ca and Mg and of one or more metals selected from the group consisting of elements of Groups Ia, IIa, IIIa, VIa, VIIa, VIII, IIb and IIIb of the Periodic Table, to convert said hexagonal boron nitride to cubic boron nitride.

17. A method according to claim 16, wherein said single amide or imide compound of Li, Ca or Mg and said one or more metals from Groups Ia, IIa, IIIa, VIa, VIIa, VIII, IIb and IIIb are used such that the total number of the metal atoms making up the compound and the latter metals is 2 parts or more to 100 parts of the number of boron making up the hexagonal boron nitride.

18. A method according to claim 17, wherein said single amide or imide compound of Li, Ca or Mg and said one or more metals from Groups Ia, IIa, IIIa, VIa, VIIa, VIII, IIb and IIIb are used such that the total number of the metal atoms making up the compound and the latter metals is 5 to 50 parts or more to 100 parts of the number of boron making up the hexagonal boron nitride.

19. A method according to claim 16, wherein said region of stability of cubic boron nitride is selected to have a temperature of 1100° C. or higher and a pressure of 3.8 GPa or higher.

20. A method according to claim 16, wherein *a conversion rate is less than 100%, so that a composite lump comprising a mixture of hexagonal boron nitride and cubic boron nitride is formed, and* the method *further* includes crushing the [converted cubic boron nitride] *composite lump*, and then adding sodium hydroxide and water thereto and heating to selectively dissolve the hexagonal boron nitride, and then cooling, acid cleaning and filtering, so as to isolate the cubic boron nitride.

* * * * *